US008838964B2

(12) United States Patent
Gregorovic et al.

(10) Patent No.: US 8,838,964 B2
(45) Date of Patent: Sep. 16, 2014

(54) PACKAGE AUDIT TOOL

(75) Inventors: Dennis George Gregorovic, Wakefield, MA (US); Tomas Kopecek, Brno (CZ); Martin Magr, Most (CZ); Daniel W. Riek, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 350 days.

(21) Appl. No.: 12/956,211

(22) Filed: Nov. 30, 2010

(65) Prior Publication Data

US 2012/0137138 A1    May 31, 2012

(51) Int. Cl.
| | | |
|---|---|---|
| *G06F 12/14* | (2006.01) | |
| *G06F 17/30* | (2006.01) | |
| *H04L 9/32* | (2006.01) | |
| *H04L 29/06* | (2006.01) | |
| *G06F 9/445* | (2006.01) | |
| *G06F 21/60* | (2013.01) | |
| *G06F 21/10* | (2013.01) | |
| *G06F 21/62* | (2013.01) | |

(52) U.S. Cl.
CPC *G06F 8/60* (2013.01); *G06F 21/60* (2013.01); *G06F 21/10* (2013.01); *G06F 8/65* (2013.01); *G06F 21/6218* (2013.01); *G06F 17/30* (2013.01)

USPC ......... 713/165; 713/167; 713/175; 713/189; 726/28; 726/29; 726/30

(58) Field of Classification Search
None
See application file for complete search history.

(56) References Cited

U.S. PATENT DOCUMENTS

| | | | | |
|---|---|---|---|---|
| 5,617,533 | A | * | 4/1997 | Wu et al. ...................... 714/38.1 |
| 7,222,341 | B2 | * | 5/2007 | Forbes et al. ................. 717/170 |
| 7,934,197 | B2 | * | 4/2011 | Thorell ......................... 717/120 |
| 2008/0091938 | A1 | * | 4/2008 | Pedersen et al. ............. 713/153 |
| 2008/0209399 | A1 | * | 8/2008 | Bonnet et al. ................ 717/122 |

* cited by examiner

*Primary Examiner* — Fatoumata Traore
(74) *Attorney, Agent, or Firm* — Lowenstein Sandler LLP

(57) ABSTRACT

A method and system for software package auditing is described. A processing device receives user input that identifies one or more software packages to be included in a software product release. The one or more identified packages are imported into a package audit tool executable by the processing device and the package audit tool automatically validates that the imported packages comply with a set of one or more requirements specified for the software product release using the package audit tool.

20 Claims, 5 Drawing Sheets

US 8,838,964 B2

PACKAGE AUDIT TOOL

TECHNICAL FIELD

Embodiments of the present invention relate to package management systems, and more specifically, to a package management tool having a package audit tool.

BACKGROUND

A package management system is a collection of tools that automate the process of installing, configuring, upgrading, and/or removing software packages from a computing system. Software products may include many distinct software packages. Software packages are distributions of software, as well as the metadata associated with the software package, such as the name, description, version number, vendor, checksum, and a list of dependencies necessary for the software to run properly. The software may be bundled and packaged in specific package formats, such as RPM, deb, slp, tgz, or the like. Typical functions of a package management system may include verifying file checksums to ensure complete software packages, verifying digital signatures, managing encapsulated files, upgrading software with the latest versions from a software repository, grouping software packages, and managing dependencies of the software packages.

Conventional package management systems, however, do not provide a centralized tool that oversees, collects, and stores important information about individual software packages (e.g., source RPM packages). These conventional systems do not track metadata for each software package and the distributions that these software packages are shipped in. For example, these conventional systems do not track cryptographic routines, libraries, and other package metadata that are implemented in the software packages. Since this information is not tracked, a person, called a maintainer, has to manually inspect the software packages to determine whether the software packages comply with product release requirements. For example, the maintainer may have to review the comments associated with the source files to determine what cryptographic functions and libraries are used by the software packages, what licenses apply to the software package, what restrictions apply, etc. Similar, because this information is not tracked, the maintainer has to manually determine if the software packages have any changes, such as changes to cryptographic routines and libraries used by the software packages, when the source code is changed. This makes certification efforts more difficult and time consuming because this information must be retrieved and verified manually. This is extremely difficult for software products that have hundreds to thousands of different software packages. In addition, not only is this manual certification process prone to human error, the manual certification process can become burdensome, since each software package may have to be manually recertified for each software product release.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
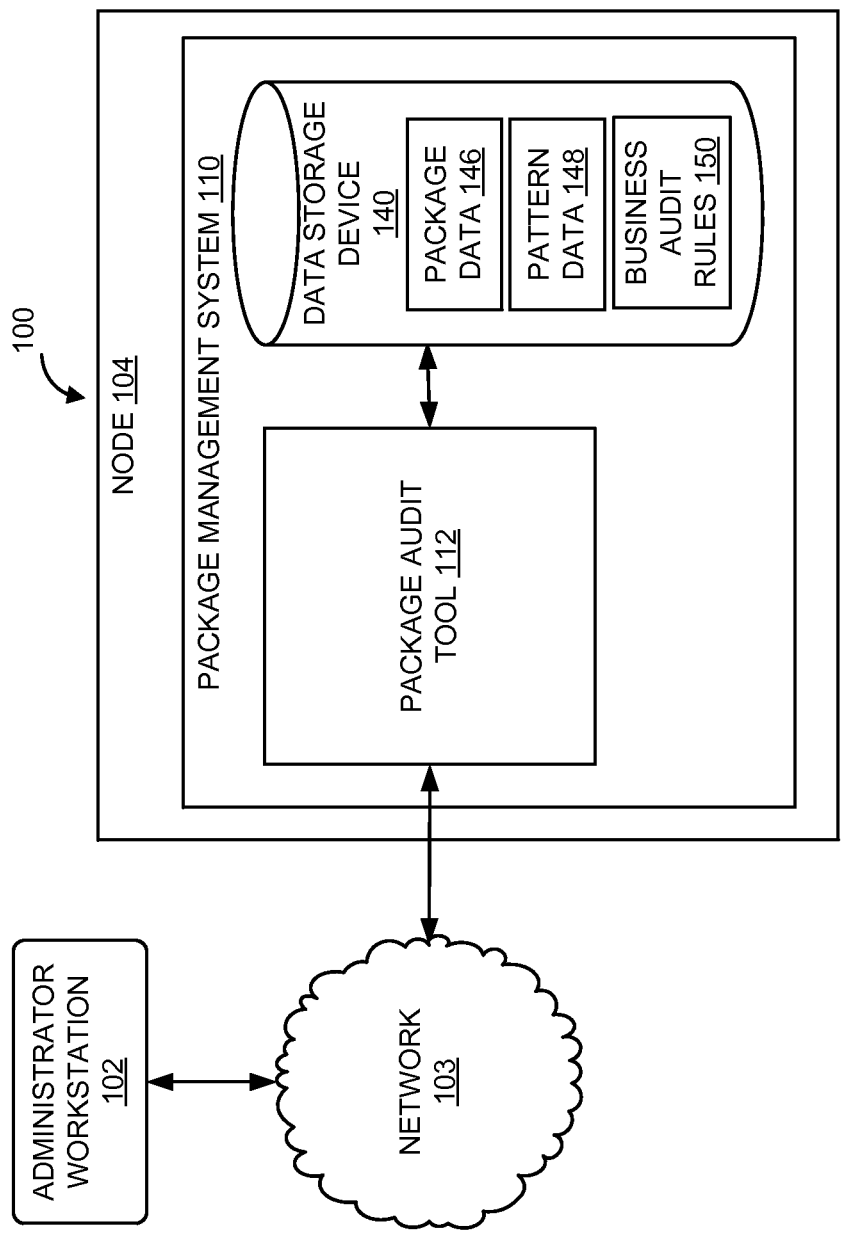
FIG. 1 is a block diagram of an exemplary network architecture in which embodiments of a package management system, having a package audit tool, may operate.

A method and system for automated software package auditing is described. In one embodiment, a package audit tool receives input that identifies one or more software packages to be included in a software package release. These software packages comprise multiple files, including source code files, configuration files, documentation files, and the like. The identified packages are imported into the package audit tool, and the package audit tool automatically validates that the imported packages comply with a set of one or more requirements specified for the software product release. In one embodiment, the package audit tool inspects each of the source code files for common patterns to detect cryptography implementation information and usage, licensing information, restrictions, contractual obligations and royalties, ownership, reviewing information, and the like. The package audit tool then can determine if this information complies with the set of one or more requirements for the software product release. For example, the set of requirements can be a set of export rules, a set of compliance rules, rules that govern the types of external sources that can be used, or the like. The product audit tool can generate a report having a list of cryptographic functions detected in the source code files and their corresponding sources (e.g., cryptographic libraries), as well as a list of licenses used by the imported packages. The package audit tool can also verify package dependencies, that each software package includes a correct list of files, and that those files are stored or installed in the correct location.

In other embodiments, the package audit tool can track information about the imported packages in a package database, and automatically determine subsequent changes to the software packages using the tracked information stored in the package database. For example, the package audit tool can track and process changes to software packages, such as source RPM (SRPM) changes after being officially imported. Originally standing for "Red Hat Package Manager," RPM now stands for "RPM Package Manager," a recursive acronym. These changes may be changes in cryptographic functions, changes to libraries, changes to licensing information, end-of-life status changes, and the like. The package audit tool can also track package release events, such as package imports, reviews, approvals, and changes for release of software products. The tracked information may include package metadata, such as cryptography implementation information and usage, licensing information, restrictions, contractual obligations and royalties, ownership, reviewing information, and the like. The tracked information may also include package inclusion information that designate the content of the software packages, such as the what software packages are in what sets or what software packages are in what products, etc. The tracked information may also include errata advisory information associated with the software package (e.g., linkage information with errata advisories), approved software package lists, white lists of files or packages, black lists of files or packages, and updates to the software packages (e.g., number of updates a software package has had since it was first released and how many hot fixes have been issued).

The embodiments described herein can be used to verify and track important information and changes in software packages. These auditing processes are automated, as compared to the conventional approach that manually inspects software package imports for approval for inclusion and for changes in the software packages. The embodiments described herein provide an improved package management system that automatically validates software packages and automatically tracks changes to these software packages. These embodiments may reduce the amount of time to validate software packages for software product releases, and can be scaled to accommodate the import of many software packages, as compared to the conventional approaches.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "quantifying," "reporting," "executing," "defining," "specifying," "initializing," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary network architecture 100 in which embodiments of a package management system 110, having a package audit tool 112, may operate. The network architecture 100 may include a node 104 that hosts the package management system 110, and an administrator workstation 102 connected via a network 103, which may be a private network (e.g., a local area network (LAN), wide area network (WAN), intranet, etc.) or a public network (e.g., the Internet). The node 104 may be one or more machines including one or more server computers, gateways, or other computing systems. The package management system 110 includes the package audit tool 112 and a data storage device 140. The data storage device 140 may include one or more storage devices (e.g., the computer-readable medium described above) that may be local to the node 104 and/or remote from the node 104. The package audit tool 112 may use the data storage device 140 to store package data 146. In one embodiment, the package data 146 may be stored in a package database. Alternatively, the package data 146 may be stored in other data stores, such as data repositories, directories (e.g., LDAP directory), or the like. The data storage device 140 may also store pattern data 148 and business audit rules 150. The pattern data 148 may include the set of common patterns (e.g., regular expressions) that are used by the package audit tool 112 when inspecting the files of the software packages. The business audit rules 150 may be a set of one or more business rules that the package audit tool 112 uses to validate compliance of the imported software packages as described in more detail below. The package audit tool 112 is described in more detail with respect to FIGS. 2-3B. The package audit tool 112 may be a stand-alone application that executes on the node 104 or may be part of the package management system 110 that may include other package-management-related processes, such as verifying file checksums to ensure complete software packages, verifying digital signatures, managing encapsulated files, upgrading software with the latest versions from a software repository, grouping software packages, managing dependencies of the software packages, and the like.

The administrator workstation 102 may be a computing device such as, for example, a desktop computer, laptop computer, server, cellular phone, personal digital assistant (PDA), etc. The administrator workstation 102 interacts with the node 104 by exchanging messages via standard protocols, e.g., FTP and HTTP. The administrator workstation 102 may also include a graphic user interface (GUI) (or other type of interface such as a command line interface) for allowing a user to identify the software packages to be included into the software product release, and to input the set of requirements for the software product release (e.g., a set of export rules, a set of compliance rules, rules that govern the types of external sources that can be used, or the like), the set of common patterns (e.g., regular expressions) to be detected in the software packages, and the information to be tracked by the package audit tool 112. Since the requirements would be driven by the particular business case and logic for the proposed product release, various requirements may be used. For example, one of the requirements may be to not include data corresponding to at least one of the patterns.

Figure 2:
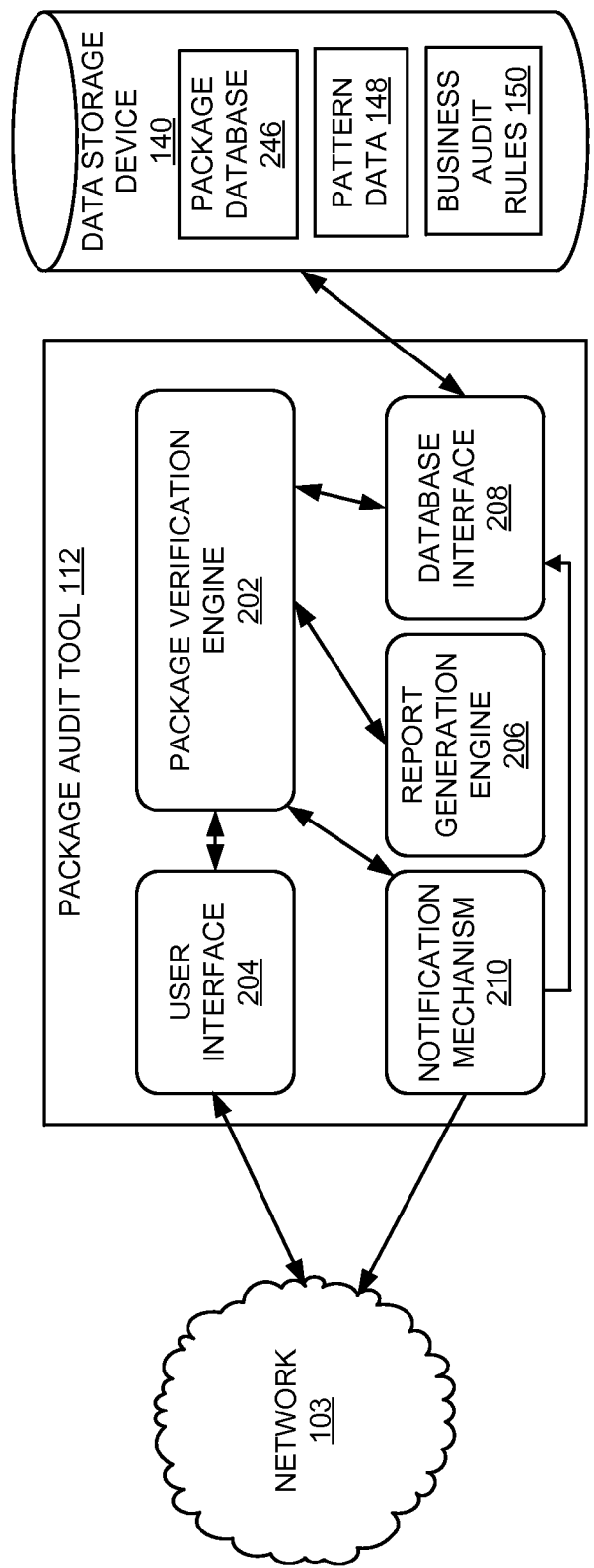
FIG. 2 is a block diagram of the package audit tool of FIG. 1 according to one embodiment.

FIG. 2 is a block diagram of the package audit tool 112 of FIG. 1 according to one embodiment. The package audit tool 112 includes a package verification engine 202, a user interface 204, a report generation engine 206, a database interface 208, and a notification engine 210. The user interface 204 may be GUI, a command line interface (CLI), or other types of interfaces known by those of ordinary skill in the art. For example, an administrator of the package audit tool 112 can access the package audit tool 112 via a browser, in which case the user interface 204 is a web-based browser. When using a web-based browser for the user interface 204, the user interface 204 may generate one or more web pages that include input fields, or other input mechanisms that allow the user to identify one or more software packages to be included in the software product release, to specify the set of requirements for the software product release, to specify the set of common patterns (e.g., regular expression) to be detected in the software packages, and/or to specify the information to be tracked by the package audit tool 112. The administrator can use the user interface 204 for other administrative functions of the package management system 110. The set of common patterns can be stored as the pattern data 148 in the data storage device 140.

Based on the user input that identifies the software packages, the package verification engine 202 imports the identified packages into the package audit tool 112, and automatically (without any user interaction) validates that the imported packages comply with the set of one or more requirements specified for the software product release (e.g., using the business audit rules 150). In one embodiment, the package verification engine 202 inspects each of the source code files of the imported packages, using the pattern data 148, to detect cryptographic functions, for example, using regular expressions to detect common patterns in the source code. In another embodiment, the package verification engine 202 inspects all the files of the software package (e.g., source files, documentation files, configuration files, etc), using the pattern data 148, to detect licensing information. Alternatively, the package verification engine 202 can inspect for other common patterns, using the pattern data 148, to detect restrictions, contractual obligations and royalties, ownership, reviewing information, or other information associated with the software packages. The package verification engine 202 can run a set of one or more business audit rules 150 to determine if the software packages comply with the set of one or more requirements specified in the business audit rules 150.

In another embodiment, the package verification engine 202 performs other operations, such as an RPM link check to verify the formal validity of the imported packages. For example, the package verification engine 202 can verify package dependencies of the software packages, verify that each of the software packages includes a correct list of files, that the software packages includes all source libraries, that the package's files are installed or stored in the correct locations, and the like. In another embodiment, the package verification engine 202 tracks information about the imported packages in a package database 246 of the data storage device 140. The package verification engine 202 interacts with the data storage device 140 via the database interface 208. For example, the package verification engine 202 can track and process changes to software packages, such as SRPM changes after being officially imported into the package audit tool 112. As described herein, the changes may be changes in cryptographic functions, changes to libraries, changes to licensing information, end-of-life status changes, and the like. The package audit tool 112 can also track package release events, such as package imports, reviews, approvals, and changes for the release of software products. The package database 246 may store package metadata, such as cryptography implementation information and usage, licensing information, restrictions, contractual obligations and royalties, ownership, reviewing information, and the like. The package database 246 may also store package inclusion information that designate the content of the software packages, such as what software packages are in what sets or what software packages are in what products, or the like. The package database 246 may also store errata advisory information associated with the software package, approved package lists, white lists of files or software packages, black lists of files or software packages, and updates to the software packages (e.g., number of updates a software package has had since it was first released and how many hot fixes have been issued). The pattern data 148 may includes a set of one or more regular expressions that can be used to detect common patterns in the files of the software packages. For example, the source code files can be inspected using a set of regular expressions to detect what cryptographic functions are used in the source code files. Similarly, documentation files or configuration files can be inspected using a set of regular expressions to detect what licensees are used by the software packages.

In another embodiment, the package verification engine 202 can use the tracked information to automatically determine subsequent changes to the imported packages without user intervention at the package audit tool 112. For example, the package verification engine 202 can collect package metadata, package inclusion information, and other information associated with the software package. This information can be extracted by the package verification engine 202 from the files of the software packages, or can be received as user input via the user interface 204 when importing the software packages into the package audit tool 112.

In some instances, the administrator of the package audit tool 112 is not the software designer or programmer of the software packages, and thus, does not know whether the software packages use certain libraries, certain cryptographic functions, licenses, etc, without performing a manual inspection. Using the package audit tool 112, the administrator does not need prior knowledge of this information, since the package audit tool 112 can collect and track this information in the package database 246. Using the package audit tool 112, the administrator can quickly review the outcome of the automated verification process to confirm that the package audit tool 112 validated the imported packages.

In another embodiment, the package audit tool 112 can generate a report using the report generation engine 206, and the administrator can review the report to verify and validate that the imported packages comply with the set of requirements. The report generation engine 206 can generate a report identifying problems with the software packages. For example, the package verification engine 202 can mark files that use software code having an unacceptable license per the requirements, and the report generation engine 206 can include this marked file in the report with a description of the problem. For another example, the package verification engine 202 can mark files utilizing cryptographic functions that are unacceptable, and the report generation engine 206 can include the marked file in the report with a description of the problem. In another embodiment, the report generation engine 206 can generate a list of cryptographic functions detected in the source code files and the corresponding sources of the detected cryptographic functions. In one embodiment, the package verification engine 202 determines if the list of cryptographic functions complies with the set of one or more requirements for the software product release. In another embodiment, the report generation engine 206 publishes the list to an administrator via the user interface 204, or via the notification mechanism 210 (described in more detail below). The administrator can review the published list to determine whether the list of cryptographic functions complies with the set of one or more requirements for the software product release. In another embodiment, the report generation engine 206 can generate a list of licenses used by the imported packages. In one embodiment, the package verification engine 202 determines if the list of cryptographic functions complies with the set of one or more requirements for the software product release. In another embodiment, the report generation engine 206 publishes the list to an administrator via the user interface 204, or via the notification mechanism 210 (described in more detail below). The administrator can review the published list to determine whether the list of cryptographic functions complies with the set of one or more requirements for the software product release. Similarly, other information can be detected and presented in the reports generated by the report generation engine 206.

In another embodiment, the report generation engine 206 can receive subsequent changes detected by the package verification engine 202 to be included in the report. In one embodiment, the report generation engine 206 generates a report that provides a package manifest, the package manifest showing, for example, the subsequent changes to the one or more software packages, such as differences between releases of the software product, or the like. The package manifest may also list the software packages included in the software package release, whether these software packages have been validated by the package audit tool 112, whether these software packages have been approved, as well as whether the software packages have problems that need to be remedied, for example, by a Security Response Team (SRT). In one embodiment, the report generation engine 206 exports a copy of the report to a specified location, such as generating the report as a log file in a specified directory. The copy of the report may be saved in a format that is consumable by the SRT, or alternatively, as a text file. In another embodiment, instead of exporting a copy of the report, the report generation engine 206 can present the results to the administrator via the user interface 204, such as a web page showing the results of the verification process. This user interface 204 may present a list of software packages to the administrator to allow the administrator to approve the software packages for inclusion into the software product release, or allow the software packages to be put on a work queue for a supervisor to approve the package's inclusion in the software product release. The user interface 204 may also receive input from the administrator that specifies which of the software packages should be included in the software product release. In another embodiment, the package verification engine 202 can use a work queue and the notification mechanism 210 to make the administrator aware of package additions submitted for approval, as well as when the package audit tool 112 detects problems with the validation process or when the package audit tool 112 is completed.

In one embodiment, the notification mechanism 210 is a messaging system that can send a message to the administrator, such as via the user interface 204, or via an external notification mechanism, such as an instant messaging application, or email application. For example, in one embodiment, the notification mechanism 210 can instruct an email application to generate an email with the report, generated by the report generation engine 206, in the body of the email, or as an attachment to the email, to one or more specified email addresses. The package verification engine 202 uses the business audit rules 150 to verify that the software packages comply with the set of requirements of the software product release. The business audit rules 150 can also be used to govern the operations of the report generation engine 206 and notification mechanism 210. These business audit rules 150 can be created and/or modified by the administrator via the user interface 204.

Figure 3A:
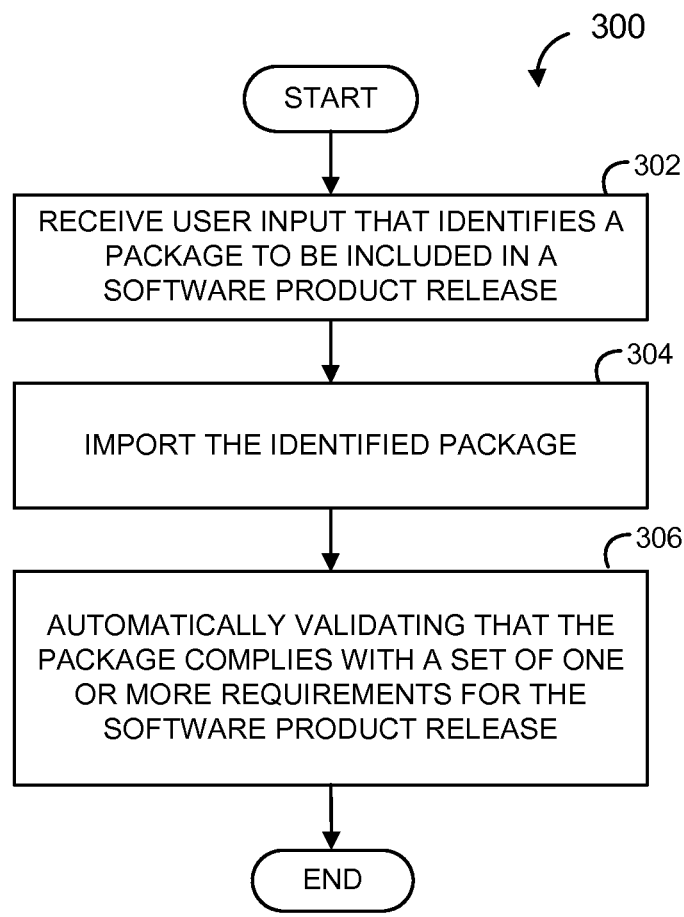
FIG. 3A is a flow diagram of one embodiment of a method of automated software package auditing.

FIG. 3A is a flow diagram of one embodiment of a method 300 of automated software package auditing. The method 300 is performed by processing logic that may comprise hardware (circuitry, dedicated logic, etc.), software (such as is run on a general purpose computing system or a dedicated machine), firmware (embedded software), or any combination thereof. In one embodiment, the package audit tool 112 of FIGS. 1 and 2 performs the method 300. Alternatively, other components of the package management system 110 can perform some or all of the operations of method 300.

Referring to FIG. 3A, processing logic begins with receiving user input that identities a software package to be included in a software product release (block 302). Next, the processing logic imports the identified package into the package audit tool (block 304) and automatically validates that the software package complies with a set of one or more requirements for the software product release (block 306).

Figure 3B:
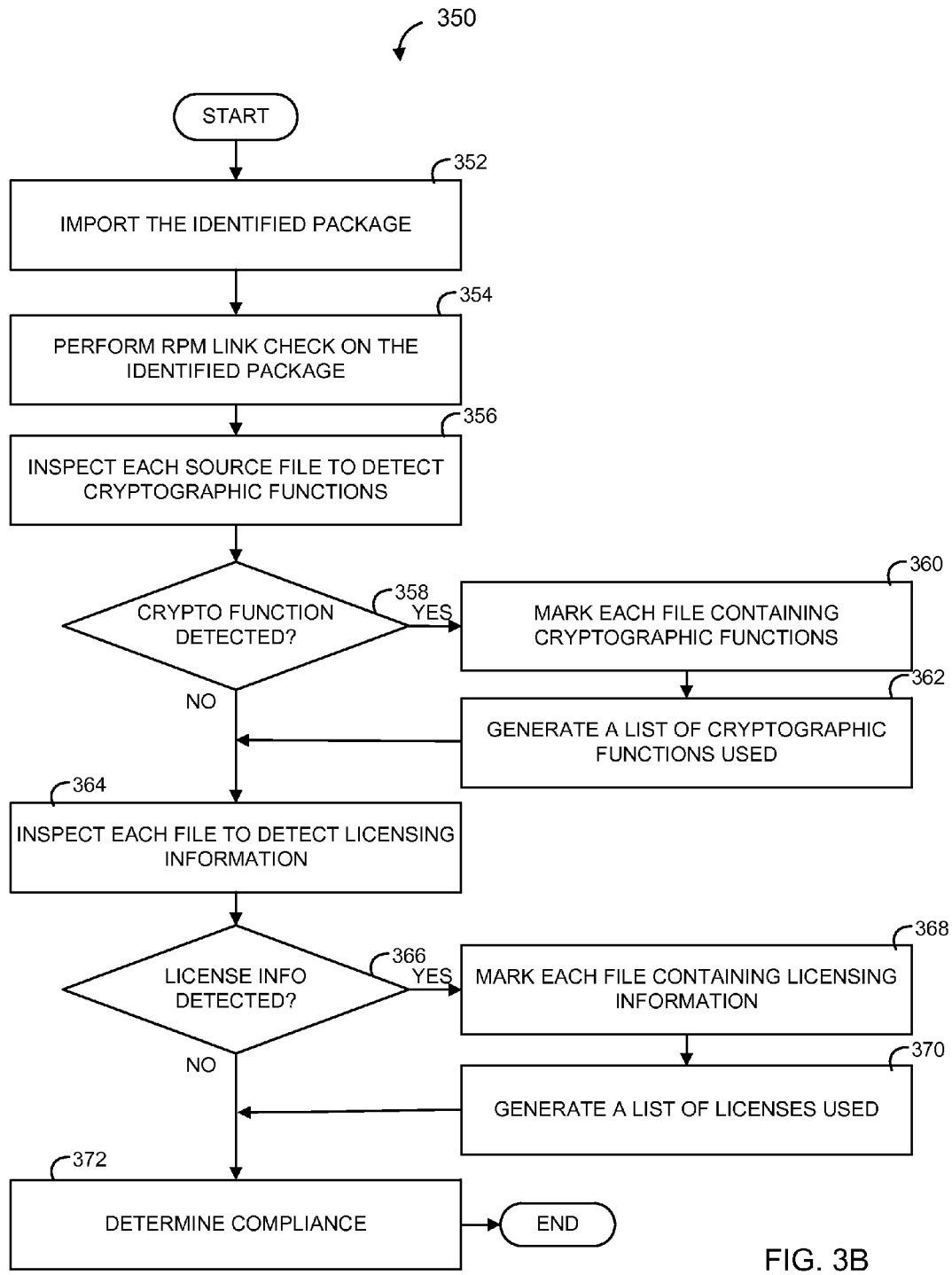
FIG. 3B is a flow diagram of one embodiment of a method of automatically validating compliance of software packages against a set of requirements specified for the software product release.

FIG. 3B is a flow diagram of one embodiment of a method 350 of automatically validating compliance of software packages against a set of requirements specified for the software product release. The method 350 is performed by processing logic that may comprise hardware (circuitry, dedicated logic, etc.), software (such as is run on a general purpose computing system or a dedicated machine), firmware (embedded software), or any combination thereof. In one embodiment, the package audit tool 112 of FIGS. 1 and 2 performs the method 3050. Alternatively, other components of the package management system 110 can perform some or all of the operations of method 350.

Referring to FIG. 3B, processing logic begins with importing the identified package (block 352), and performing an RPM link check on the identified package (block 354). In one embodiment, the RPM link check verifies package dependencies, verifies that each of the one or more software packages includes a correct list of files, and verifies that files of the software package are installed or stored in the correct location. Alternatively, the RPM link check may perform other functions to verify the formal validity of the software package. Next, the processing logic inspects each source file of the software package to detect cryptographic functions being used by the source files (block 356). In one embodiment, the processing logic inspects each of the source code files of the software package for a set of one or more pre-defined common patterns (e.g., using regular expressions) to detect the cryptographic functions. The processing logic determines if cryptographic functions are detected (block 358). If cryptographic functions are detected at block 358, the processing logic marks each file containing the cryptographic functions (block 360), and generates a list of cryptographic functions used by the software package (block 362). The list can identify the cryptographic functions used, as well as their respective sources. If cryptographic functions are not detected at block 358, the processing logic continues, and inspects each file (e.g., source files, documentation files, configuration files, etc) to detect licensing information (block 364). In one embodiment, the processing logic inspects each of the files of the software package for a set of one or more pre-defined common patterns (e.g., using a set of one or more regular expressions) to detect the licensing information. If licensing information is detected at block 364, the processing logic marks each file containing the licensing information (block 368), and generates a list of licenses used by the software package (block 370). If licensing information is not detected at block 364, the processing logic continues, and determines the compliance of the imported package against the set of one or more requirements specified for the software product release (block 372), and the method ends. In one embodiment, the processing logic determines compliance by determining if the list of cryptographic functions and the list of licenses comply with the set of rules. For example, the processing logic can verify that each cryptographic function is on an approved list and that each license is on an approved license list, or that none of the cryptographic functions are on disapproved list and that none of the licenses are on a disapproved license list. It should be noted that the method 350 can be performed for each software package identified to be included in the software product release. It should also be noted that similar operations can be performed to inspect the files of the software packages for other common patterns to detect other information, such as restrictions, contractual obligations and royalties, ownership, reviewing information, and the like.

In another embodiment, the processing logic tracks information about one or more imported packages in a package database, and uses the tracked information to automatically determine subsequent changes to the imported packages. For example, the processing logic may detect an introduction or removal of cryptographic functions in the software package (s), an introduction or removal of one or more libraries in the software package(s), a difference in licensing information of the software package(s), and an end-of-life status change for the software packages(s). In order to track the information, the processing logic can collect package metadata, package inclusion information, as well as other package information, such as cryptography implementation and usage information, licensing information, restrictions, contractual obligations and royalties, and ownership information. This information can be received as user input from various sources, including the person submitting the software package for inclusion approval, the administrator of the package audit tool, or other people associated with the software package release. Alternatively, this information can be extracted by the processing logic from the files of the software package itself.

In another embodiment, the processing logic can perform a comparative analysis of the imported packages against previous versions of the software packages to detect the subsequent changes. In another embodiment, the processing logic can execute an rpmdiff function to detect the changes. In another embodiment, the processing logic can determine the subsequent changes by unpacking and preparing a source tree of each of the software packages (e.g., run rpmbuild-bp $SRPM), and checking all the files in the source tree to see if they are in a certification list. The certification list may be stored as package data in the data storage device, and may be updated by an administrator via a user interface. If the processing logic determines a file is on the certification list, the processing logic compares versions of the respective file to detect any differences between the versions, and flags an error that shows the differences. If the processing logic determines that a file is not on the certification list, the processing logic flags an error indicating that the file is not on the certification list. The processing logic can also note that these errors may break the given certification of the software package. The processing logic can perform these operations for all RPMs going through the errata system, for example.

In other embodiments, the processing logic can track information other than cryptographic information and licensing information. For example, the processing logic may track linkage information with errata advisories, approved package lists, updates to the imported packages, and/or other package auditing information.

It should be noted that the processing logic may bundle and package the software in specific package formats, such as RPM, deb, slp, tgz, .jar, or the like. It should be noted that although the various embodiments described herein are described using bytecode type packages, in other embodiments, similar operations, and possibly equivalent operations may be performed for java code type packages (.jar files) as would be appreciated by one of ordinary skill in the art having the benefit of this disclosure.

Figure 4:
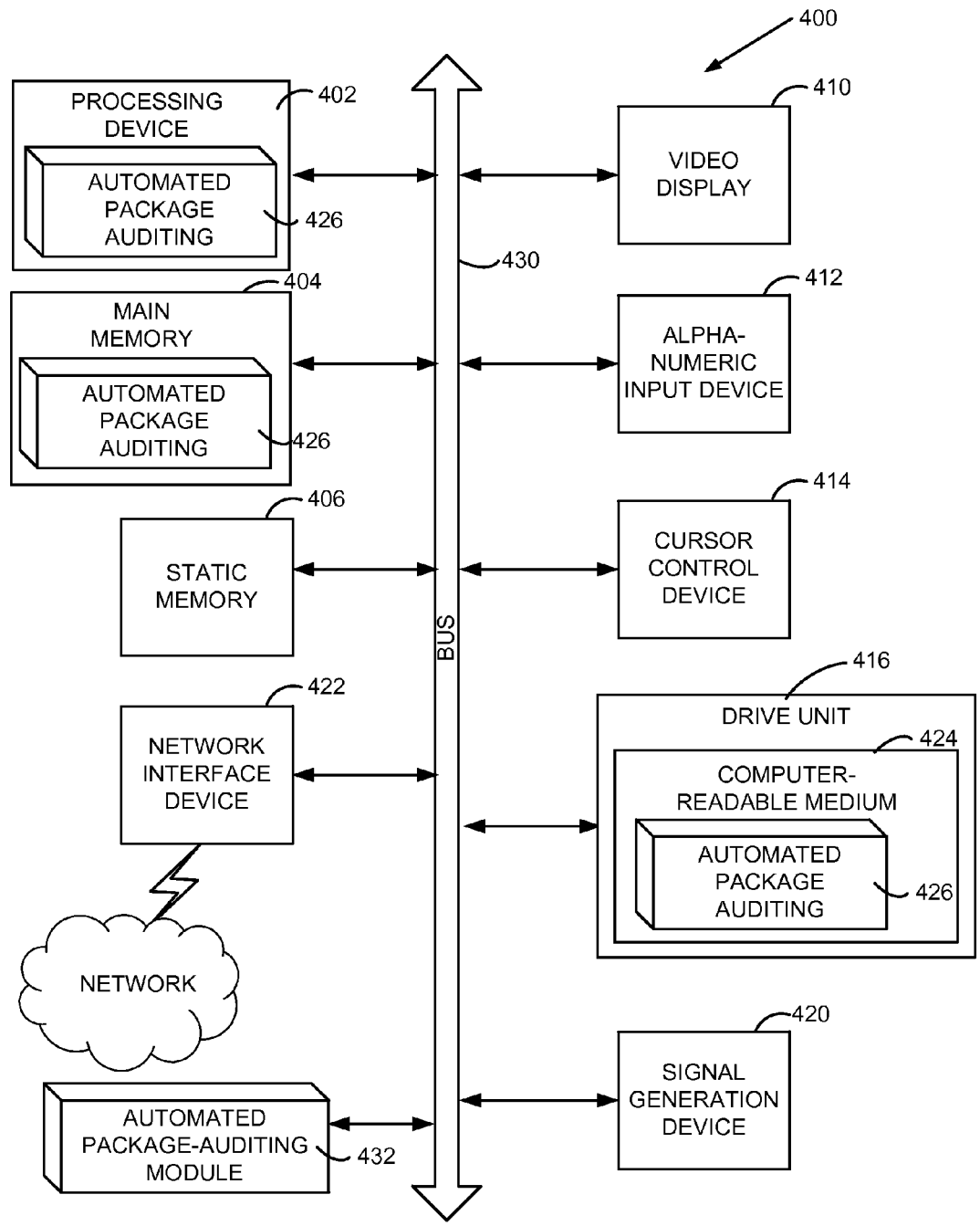
FIG. 4 illustrates a diagrammatic representation of a machine in the exemplary form of a computing system for automated software package auditing.

FIG. 4 illustrates a diagrammatic representation of a machine in the exemplary form of a computing system 400 for software package auditing. Within the computing system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for software package auditing, such as the methods 300 and 350 described above. In one embodiment, the computing system 400 represents various components that may be implemented in the node 104 as described above. Alternatively, the node 104 may include more or less components as illustrated in the computing system 400.

The exemplary computing system 400 includes a processing device 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., automated package auditing 426) for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., automated package auditing 426) embodying any one or more of the methodologies or functions described herein. The automated package auditing 426 may also reside, completely or at least partially, within the main memory 404 and/or within the processing device 402 during execution thereof by the computing system 400, the main memory 404 and the processing device 402 also constituting computer-readable storage media. The automated package auditing 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The automated package-auditing module 432, components, and other features described herein (for example in relation to FIGS. 1 and 2) can be implemented as discrete hardware components or integrated in the functionality of hardware components such as ASICS, FPGAs, DSPs, or similar devices. The automated package-auditing module 432 may implement operations of long-term load generation as described herein with respect to FIGS. 3, 4A, and 4B. In addition, the automated package-auditing module 432 can be implemented as firmware or functional circuitry within hardware devices. Further, the automated package-auditing module 432 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   receiving, by a processing device, user input that identifies a software package to be included in a software product release, wherein the software package comprises a plurality of files;
   importing the identified package into a package audit tool executed by the processing device;
   validating that the imported package complies with a requirement specifying a type of external source used for the software product release using the package audit tool;
   tracking, by the package audit tool, information about the software package after being imported in a package database; and
   determining, by the package audit tool, subsequent changes to the software package after being imported using the tracked information stored in the package database, wherein said determining the subsequent changes comprises:
      unpacking a source tree of each of the software packages;
      checking the files in the source tree to determine if at least one of the files is in a certification list;
      comparing a version of a file from the plurality of files with a file in the source tree to detect a difference between versions;
      flagging a first error indicating the difference in response to a file in the certification list; and
      flagging a second error indicating that the file is not on the certification list in response to a file not in the certification list.

2. The method of claim 1, wherein the plurality of files includes one or more source code files, and wherein said validating comprises:
   inspecting each of the source code files to detect cryptographic functions;
   generating a list of cryptographic functions detected in the source code files and sources of the detected cryptographic functions; and
   determining if the list of cryptographic functions complies with the requirement for the software product release.

3. The method of claim 2, wherein said inspecting each of the source code files to detect cryptographic functions comprises inspecting each of the source code files for a pre-defined common pattern to detect the cryptographic functions.

4. The method of claim 2, wherein said inspecting each of the source code files to detect cryptographic functions comprises inspecting each of the source code files using a regular expression to detect the cryptographic functions.

5. The method of claim 1, wherein said validating comprises:
   inspecting each of the plurality of files to detect licensing information;
   generating a list of licenses used by the software package; and
   determining if the list of licenses complies with the requirement specified for the software product release.

6. The method of claim 5, wherein said inspecting each of the plurality of files to detect licensing information comprises inspecting each of the plurality of files for a pre-defined common pattern to detect the licensing information.

7. The method of claim 5, wherein said inspecting each of the plurality of files to detect licensing information comprises inspecting each of the plurality of files using a regular expression to detect the licensing information.

8. The method of claim 1, wherein said validating comprises performing a package manager link check on the software package to validate that the software package comply with the requirement specified for the software product release.

9. The method of claim 8, wherein said performing the package manager link check comprises performing at least one of the following:

verifying a package dependency of the software package;
verifying that the software package includes a correct list of files; and
verifying that the plurality of files are stored in correct locations.

10. The method of claim 1, wherein said determining subsequent changes comprises detecting at least one of an introduction or removal of cryptography functions in the software package, an introduction or removal of a library in the software package, a difference in licensing information of the software package, or an end-of-life status change for the software package.

11. The method of claim 1, wherein said tracking comprises:
collecting package metadata associated with the software package;
storing the package metadata in the package database;
collecting package inclusion information that indicates contents of the software package in the software product release; and
storing the package inclusion information in the package database.

12. The method of claim 11, wherein the package metadata comprises at least one of cryptography information, licensing information, restrictions, contractual obligations and royalties, or ownership information.

13. The method of claim 1, wherein said determining changes comprises performing a comparative analysis of the software package against a previous version of the software package to detect the subsequent changes to the software package.

14. The method of claim 1, wherein said tracking further comprises tracking at least one of linkage information with errata advisories, approved packaged lists, or updates to the software package.

15. The method of claim 1, further comprising:
generating a report that provides a package manifest, wherein the package manifest indicates the subsequent changes to the software package; and
publishing the report.

16. A non-transitory computer readable storage medium including instructions that, when executed by a processing device, cause the processing device to perform operations comprising:
receiving, by the processing device, user input that identifies a software package to be included in a software product release, wherein each of the software package comprises a plurality of files;
importing the software package into a package audit tool executable by the processing device;
validating that the software package complies with a requirement specifying a type of external source used for the software product release using the package audit tool;
tracking, by the package audit tool, information about the software package after being imported in a package database; and
determining, by the package audit tool, subsequent changes to the software package after being imported using the tracked information stored in the package database, wherein said determining the subsequent changes comprises:
unpacking a source tree of each of the software packages;
checking the files in the source tree to determine if at least one of the files is in a certification list;
comparing a version of a file from the plurality of files with a file in the source tree to detect a difference between versions;
flagging a first error indicating the difference in response to a file in the certification list; and
flagging a second error indicating that the file is not on the certification list in response to a file not in the certification list.

17. The computer readable storage medium of claim 16, wherein the subsequent changes are at least one of source package manager changes, changes to cryptography routines, changes to libraries, or change of end-of-life status.

18. A system, comprising:
a data storage device comprising a package database that stores information about a software package associated with a software product release; and
a processing device coupled to the data storage device and to execute a package audit tool, wherein the package audit tool is to:
receive, by the processing device, user input that identifies a software package to be included in a software product release, wherein each of the software package comprises a plurality of files:
import the software package,
validate that the software package complies with a requirement specifying a type of external source used for the software product release,
track, by the package audit tool, information about the software package after being imported in a package database; and
determine, by the package audit tool, subsequent changes to the software package after being imported using the tracked information stored in the package database, wherein said determine the subsequent changes comprises:
unpack a source tree of each of the software packages;
check the files in the source tree to determine if at least one of the files is in a certification list;
compare a version of a file from the plurality of files with a file in the source tree to detect a difference between versions;
flag a first error indicating the difference in response to a file in the certification list; and
flag a second error indicating that the file is not on the certification list in response to a file not in the certification list.

19. The system of claim 18, wherein the package audit tool comprises:
a user interface to receive user input that identifies the software package to be included in the software product release, wherein the software package comprises a plurality of files;
a package verification engine to import the identified software packages and to validate the software package; and
a database interface to allow the package verification engine access to the package database.

20. The system of claim 19, wherein the package audit tool further comprises:
a report generation engine to generate a report comprising a package manifest; and
a notification component to send the report to an administrator of a package management system.

* * * * *